(12) United States Patent
Novick et al.

(10) Patent No.: US 12,042,987 B2
(45) Date of Patent: Jul. 23, 2024

(54) SELECTIVE DEPOSIT OF A FUNCTIONAL AGENT

(71) Applicant: HEWLETT-PACKARD DEVELOPMENT COMPANY, L.P., Spring, TX (US)

(72) Inventors: Michael Alexander Novick, San Diego, CA (US); David Ramirez Muela, Sant Cugat del Valles (ES); Luis Garcia Garcia, Sant Cugat del Valles (ES); Andre Garcia, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 27 days.

(21) Appl. No.: 16/605,653

(22) PCT Filed: Nov. 27, 2017

(86) PCT No.: PCT/US2017/063255
§ 371 (c)(1),
(2) Date: Oct. 16, 2019

(87) PCT Pub. No.: WO2019/103750
PCT Pub. Date: May 31, 2019

(65) Prior Publication Data
US 2021/0283835 A1 Sep. 16, 2021

(51) Int. Cl.
*B29C 64/165* (2017.01)
*B29C 64/393* (2017.01)
(Continued)

(52) U.S. Cl.
CPC .......... *B29C 64/165* (2017.08); *B29C 64/393* (2017.08); *B33Y 10/00* (2014.12);
(Continued)

(58) Field of Classification Search
CPC ..... B29C 64/165; B29C 64/393; B33Y 10/00; B33Y 50/02
(Continued)

(56) References Cited

U.S. PATENT DOCUMENTS 6,251,340 B1    6/2001  Tseng
6,405,095 B1 *  6/2002  Jang ...................... B29C 64/165
                                                    264/633
(Continued)

FOREIGN PATENT DOCUMENTS

CN    101561674 A    10/2009
CN    204869682 U    12/2015
(Continued)

OTHER PUBLICATIONS

Miyanaji (Equilibrium Saturation in Binder Jetting Additive Manufacturing Processes: Theoretical Model Vs. Experimental Observations, Solid Freeform Fabrication 2016: Proceedings of the 26th Annual International Solid Freeform Fabrication Symposium) (Year: 2016).*

*Primary Examiner* — Michael A Tolin
*Assistant Examiner* — Hana C Page
(74) *Attorney, Agent, or Firm* — Michael Dryja

(57) ABSTRACT

Certain examples described herein control an amount of a functional agent that is deposited in a three-dimensional printing system. In certain examples, an amount of a functional agent is controlled based on a distance function, wherein the distance function is associated with a distance between a particular portion of an object to be fabricated and a surface of the object. The functional agent may be a binder, a fusing agent or a detailing agent, amongst others.

11 Claims, 5 Drawing Sheets

(51) Int. Cl.
  *B33Y 10/00* (2015.01)
  *B33Y 30/00* (2015.01)
  *B33Y 50/02* (2015.01)
  *B29K 77/00* (2006.01)

(52) U.S. Cl.
  CPC .............. *B33Y 30/00* (2014.12); *B33Y 50/02* (2014.12); *B29K 2077/00* (2013.01)

(58) Field of Classification Search
  USPC ........................................................ 264/405
  See application file for complete search history.

(56) References Cited

U.S. PATENT DOCUMENTS

| | | | |
|---|---|---|---|
| 7,497,977 B2 * | 3/2009 | Nielsen | H04N 1/4092 347/54 |
| 9,827,715 B2 * | 11/2017 | Okamoto | B29C 64/106 |
| 2002/0079601 A1 | 6/2002 | Russell et al. | |
| 2007/0076021 A1 | 4/2007 | Stancik et al. | |
| 2014/0265040 A1 | 9/2014 | Batchelder | |
| 2016/0332374 A1 * | 11/2016 | Nauka | B29C 35/16 |
| 2017/0021569 A1 | 1/2017 | Aramendia et al. | |

FOREIGN PATENT DOCUMENTS

| | | | |
|---|---|---|---|
| CN | 107236288 A | 10/2017 | |
| EP | 3117982 A1 | 1/2017 | |
| JP | 2009-154497 A | 7/2009 | |
| WO | WO-9208200 A1 * | 5/1992 | ........... B29C 64/124 |
| WO | WO2015108546 A3 | 10/2015 | |
| WO | WO2016088042 A1 | 6/2016 | |
| WO | WO2016122660 A1 | 8/2016 | |
| WO | WO-2016175813 A1 | 11/2016 | |
| WO | WO2017034951 A1 | 3/2017 | |
| WO | 2017/099645 A1 | 6/2017 | |
| WO | WO-2017162306 A1 | 9/2017 | |
| WO | WO2017189306 A1 | 11/2017 | |

* cited by examiner

| $D_z$ | 0 | 1 | 2 | 3 | 4 | 5 | 6 | 7 | ... |
|---|---|---|---|---|---|---|---|---|---|
| SF | 15 | 25 | 50 | 75 | 100 | 100 | 100 | 100 | 100 |

| $D_{XY}$ | 1-4 | 5-6 | 7-8 | 9-10 | 11-12 | 13-14 | 15+ |
|---|---|---|---|---|---|---|---|
| SF | 200 | 180 | 160 | 140 | 120 | 110 | 100 |

SELECTIVE DEPOSIT OF A FUNCTIONAL AGENT

BACKGROUND

Fabrication systems, including those commonly referred to as "3D printers", provide a convenient way to produce three-dimensional objects. These systems may receive a definition of the three-dimensional object in the form of an object model. This object model is processed to instruct the system to produce the object using one or more material components. This may be performed on a layer-by-layer basis in a working area of the system. Chemical agents, referred to as "functional agents", may be selectively deposited onto each layer within the working area. In one case, the functional agent may comprise a binder that causes build material particles to coalesce. In another case, the functional agents may comprise a fusing agent and/or a detailing agent, among others. In this case, the fusing agent is selectively applied to a layer in areas where particles of the build material are generally to fuse together. Energy may then be applied, such as using an infrared lamp, to fuse areas of a layer where fusing agent has been deposited. A detailing agent may be applied to control thermal aspects of a layer of build material, e.g. to provide cooling of portions of the layer. The general process of applying a functional agent and solidifying according to an object model may then be repeated for further layers until the object is fabricated.

DETAILED DESCRIPTION

Figure 1:
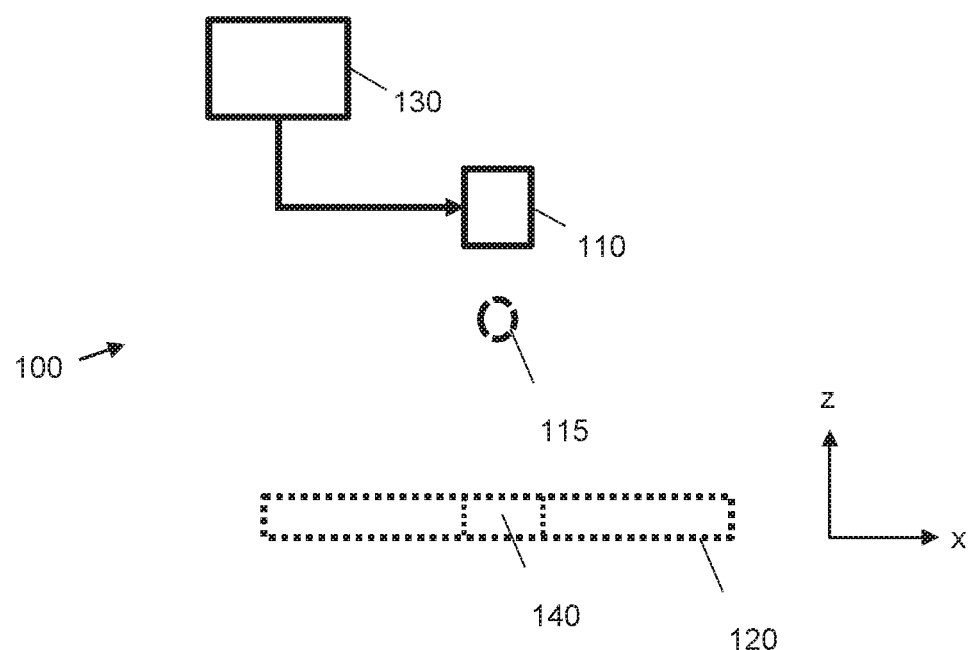
FIG. 1 is a schematic diagram of a three-dimensional printing system according to an example.

Certain examples described herein control an amount of a functional agent that is deposited in a three-dimensional printing system. In particular, certain examples control an amount of a functional agent based on a distance function, wherein the distance function is associated with a distance between a particular portion of an object to be fabricated and a surface or edge of the object. These examples may be useful for configuring how a functional agent is applied during fabrication of an object part. The examples may be applied at a start of fabrication and/or at any time where a portion of an object is formed on non-solidified layers of build material. A portion of an object may be formed on non-solidified layers of build material in, for example, overhanging regions or in cases where multiple objects are nested together in a build volume. In the latter cases, multiple objects may be fabricated at different heights within a build chamber. In different examples the functional agent may be a binder, a fusing agent or a detailing agent, amongst others.

Within three-dimensional printing systems, it is often desired to fabricate high quality objects. For example, these may be objects with well-defined surfaces and good stability. Stability may be defined as a property of a build process; stable objects may avoid part and printer failure, e.g. due to lifted or curled edges of solidified portions of a layer of build material. Similarly, it is often desired to reduce or avoid fabrication artefacts including "fuzzy" or poorly defined surfaces, curl and partial solidification. Issues with object quality during fabrication may lead to objects being discarded. If lifting of an edge is severe, the build process may need to be interrupted and restarted.

Three-dimensional printing systems may also use a variety of build materials. These build materials may comprise powdered build materials and the like. Different build materials may have different properties such as flow properties within supply systems, physical properties such as particle size, and chemical properties such as fusing temperature or recyclability. Different three-dimensional printing system implementations may use different build materials, e.g. based on the design configuration of system components.

By varying an amount of a functional agent based on a distance function, a feathering effect may be achieved that improves object quality. For example, surface quality may be improved such that objects have well-defined outer portions and edges. Additionally, "bleed" effects may be reduced or avoided, "bleed" effects being where solidification of a surface of an object "bleeds" into surrounding build material that should be unsolidified, e.g. due to thermal bleed effects or physical flow of liquid agents.

By varying an amount of a functional agent, displacement of build material during deposit may be reduced or avoided. For example, this may allow the use of powdered materials that are prone to "splashing", such as finer powdered materials, when functional agents are applied. A function that sets an amount of functional agent may be dependent on build material type, e.g. such that less functional agent is applied to build materials having smaller particle sizes. This can increase part quality, e.g. by reducing or avoiding displacement of build material to nearby areas following application of a functional agent. By reducing displacement of build material, printing system functionality may also be improved, e.g. reliability of print head components may be increased by reducing or avoiding clogging of printhead nozzles by stray airborne build material. For example, by printing one or more functional agents less densely on initial layers of non-solidified portions of build material, an overall force applied to the build material by the ejection of printing agents may be reduced until underlying layers are solidified. Once a number of underlying layers have been solidified then a portion of build material may withstand a greater force and functional agent usage may be increased, e.g. by increasing a density of functional agent application.

FIG. 1 shows an example three-dimensional printing system 100. The three-dimensional printing system 100 comprises a print head 110. The print head 110 is arranged to selectively deposit a functional agent 115 upon a bed of build material 120. The print head 110 may be moveable relative to the bed of build material 120. In one case, the print head 110 may be located in a moveable carriage located above the bed of build material 120. The print head may move in one or two directions over the bed of build material 120. In another case, the bed of build material 120 may be moveable underneath a static print head. Various combinations of approaches are possible.

In use, "selectively deposit" may refer to the controlled deposit of drops of functional agent on addressable areas of the bed of build material 120. For example, the three-dimensional printing system 100 may control relative movement between the print head 110 and an upper surface of the bed of build material 120, such that one or more drops of functional agent may be deposited in one of N*M areas of the upper surface, where N is an x-axis (print) resolution and M is a y-axis (print) resolution. An example drop size is 9 picolitres, although larger or smaller drop sizes are possible depending on the print head configuration. This may be a similar process to printing ink on a print medium such as paper. The functional agent may comprise a liquid that is ejected by an ejection mechanism of the print head 110. For example, the print head 110 may comprise a plurality of nozzles that may be independently controlled to eject the functional agent. The ejection mechanism may be based on piezo-electric or thermal elements. The three-dimensional printing system 100 may have a resolution similar to that of a two-dimensional printing system, e.g. 600 or 1200 dots per square inch (DPI).

In the three-dimensional printing system 100 of FIG. 1, an object may be built up layer by layer. Each layer of build material may have a thickness in the z-axis. In one case, this thickness may be between 70-120 microns, although in other examples thicker or thinner layers may be formed. The three-dimensional printing system 100 is arranged to solidify portions of build material in each successive layer in accordance with the selective deposit of the functional agent.

In one example, the functional agent comprises a binding agent or "binder". Deposit of the functional agent on an addressable area of a layer of build material may cause build material within that addressable area to solidify via binding. In certain cases, energy may be applied to the layer of build material following application of a chemical binding agent, e.g. using an energy source. The application of energy may act to dry, cure and/or activate the chemical binding agent to bind portions of the layer of build material. For example, drying may comprise thermal drying and curing may comprise thermal and/or ultra-violet curing of a chemical binder agent.

In another example, the functional agent comprises an energy absorbing fusing agent. In this case, the three-dimensional printing system 100 further comprises an energy source that applies energy to the bed of build material 120. In this case, the fusing agent controls the fusion of particles of build material with the bed of build material. For example, in a simple case, areas of the bed of build material 120 that receive drops of fusing agent may solidify following application of energy, whereas portions of the build material on which no fusing agent is delivered may not solidify. In a more complex case, fusion of the bed of build material 120 may be controlled with the fusing agent based on a thermal profile of the bed; in this case, there may not be a one-to-one mapping between solidification and fusing agent deposit, e.g. thermal bleed may cause some portions on which no fusing agent was printed to heat up sufficiently to solidify. These effects may be taken into account when determining where to apply fusing agent to generate solid portions that correspond to solid portions of a desired object.

An energy absorbing fusing agent may cause portions of build material on which it is applied to heat up above a build material melting point when energy is applied thereto. This may then cause melting and subsequent solidification of portions of build material, e.g. solidification upon cooling. A fusing agent may include a chemical compound that absorbs a particular band of electro-magnetic radiation, such as a wide band of infra-red and optical wavelengths. The chemical compound may comprise a derivative of carbon black. The chemical compound may reside within a water-based carrier. The energy source may comprise a source of electromagnetic radiation such as an infra-red lamp or laser. The energy source may be statically mounted to apply energy uniformly to the bed of build material 120, or may be dynamically mounted above the bed, e.g. in a similar manner to a moveable carriage for the print head 110.

In yet another example, the functional agent comprises a detailing agent. Fusing agents and detailing agents are separate types of functional agent, e.g. fusing agents may act to increase thermal absorption while detailing agents may act to cool a portion of build material. They may be used separately or together. In this case, the three-dimensional printing system 100 also further comprises an energy source as described above.

A detailing agent acts to control a thermal profile of a layer of build material, e.g. via a cooling effect. In one case, a detailing agent may comprise a liquid such as water. A detailing agent may not include the energy absorbing chemical compounds used in a fusing agent. A detailing agent may be used to inhibit fusing of build material when energy is applied. In this case, areas of the bed of build material 120 that receive only drops of detailing agent may be prevented from solidifying following application of energy. For example, where energy is applied to cause fusing (e.g. a layer of build material is heated to just beyond a fusing point), fusing may be inhibited where the detailing agent is applied (e.g. portions with applied detailing agent remain below the fusing point). Detailing agent may be deposited on portions of a layer of build material where no fusing agent is applied to reduce and/or prevent thermal bleed into those areas. For example, detailing agent may be applied adjacent to portions where fusing agent is applied to give better object edge definition. Detailing agent may also be used on areas where fusing agent is applied to provide thermal control (e.g. provide a cooling effect) to those areas, but without preventing thermal fusing of those areas. In yet other case, detailing agent may be used to 'modulate' a degree of coalescence, e.g. to control mechanical properties (such as strength) of a portion of an object.

In certain cases, multiple functional agents may be used. In this case there may be different print heads for each functional agent. There may be multiple functional agents of a given type having different colors. For example, multiple binding or fusing agents may be provided, where each agent is associated with a different color (e.g. cyan, magenta, yellow and black colored agents). In this case, a build material may comprise a white powdered material that takes on the color of deposited functional agents. In certain cases, a detailing agent may be colored and applied to portions of build material outside of a boundary of an object. This may color any stray build material that becomes bound to a surface of an object during the fusing process, to improve the color gamut of the object.

In certain cases, a fusing agent and a detailing agent may be used together. For example, as described above, a detailing agent may be deposited on portions of the bed of build material 120 that are next to an edge of an object being fabricated, wherein the portions of the bed which are to form solid portions of the object receive fusing agent. In this case multiple print heads may be provided, e.g. one for each of the fusing agent and the detailing agent. In certain cases, where one or more of fusing agent and detailing agent are used, it should be noted that portions of the bed of build material on which neither detailing agent nor fusing agent are deposited may not heat up enough to solidify (e.g. excluding any effects of thermal bleed).

In one case, a functional agent may comprise a transformation agent that is configured to modify material properties of the build material. For example, a transformation agent may affect the mechanical and/or physical properties of an area of build material. This may be effected by chemical or material mechanisms, e.g. a transformation agent in the form of a conductive liquid may modify the conductive of a solidified portion.

The three-dimensional printing system 100 of FIG. 1 further comprises a print controller 130. The print controller 130 may comprise an embedded processor within the three-dimensional printing system 100. The embedded processor may be coupled to an embedded memory from which instructions in the form of program code may be retrieved and executed. The print controller 130 may alternatively comprise specific electronic circuitry such as a microprocessor, system-on-chip, field programmable gate array or application specific integrated circuit. In one case, the print controller 130 may comprise a computing device that is communicatively coupled to a three-dimensional printer.

In FIG. 1, the print controller 130 is communicatively coupled to, and arranged to control, the print head 110. The print controller 130 may generate print control data that is used to control the ejection of drops of functional agent from the print head 110. In the example of FIG. 1, the print controller 130 determines an amount of the functional agent 115 to be deposited by the print head 110 on a given portion 140 of the bed of build material 120. The print controller 130 determines the amount as a function of a distance between the given portion and a surface of a three-dimensional object to be fabricated. For example, the print controller 130 may determine a distance of the portion 140 from a surface of the object to be fabricated. In one case, an amount may be determined in terms of drops to be applied over a defined area of the bed of build material 120, i.e. on a density of agent application. The surface may be a base or side of the object. The surface may form part of a boundary of the object, e.g. may comprise an outer surface. The surface may also be an internal surface, e.g. for a hollow or aperture of the object. The given portion 140 may correspond to a voxel in a digital domain, i.e. an addressable unit in a modelled three-dimensional space. The distance may be computed based on a number of voxels in one of the three spatial dimensions (x, y and z) from a voxel corresponding to the given portion 140 and a voxel representing the surface of the object. In certain cases, there may not be a one-to-one mapping between a voxel in the digital domain and a portion of a layer of build material, e.g. a voxel may be mapped to a plurality of addressable areas of a layer of build material and/or a plurality of layers. In this case, the distance may still be computed based on a voxel distance as measured in the digital domain or may be computed based on print resolution distances, such as a number of addressable areas in the x-y plane and/or a number of layers in the z-direction. In certain cases, the distance may be a normalized distance. Each portion in a layer may have a different distance to the surface if the surface is non-uniform or curved. In one case, the function may scale or modulate an amount of functional agent to deposit based on the distance. This may involve reducing an amount of functional agent as a distance to a lower surface of the object in the z-axis decreases. In another case, it may involve increasing an amount of functional agent as a distance to a lateral surface of the object in the x-y plane decreases. This modulation of the functional agent may help reduce thermal bleed and/or physical flow and increase edge quality of a printed object. In examples where the print head 110 comprises a thermal jetting print head, a density of functional agent usage may be determined by the print controller 130. This may be proportional to a number of drops of functional agent. In examples where the print head 110 comprises a piezo-electric print head, then a drop size and/or number of drops may be determined.

As such, given the arrangement described above, the print controller 130 is configured to differentially instruct printing of the functional agent based on different distances. For example, consider first and second portions of build material to be solidified, the first and second portions being at different locations and corresponding to different portions of a three-dimensional object to be fabricated. In this case, the print controller 130 instructs the print head 110 to print a first amount of the functional agent 115 upon the first portion of build material based on a first distance between the first portion and a surface of the three-dimensional object. The print controller 130 also instructs the print head 110 to print a second amount of the functional agent 115 upon the second portion of build material based on a second distance between the second portion and the surface of the three-dimensional object. In this case, the first and second amounts differ based on different first and second distances.

The build material may be a dry, or substantially dry, powder or powder-like material. In other examples, the build material may comprise a liquid-type build material such as a viscous liquid, paste, or gel. The build material may have an average volume-based cross-sectional particle diameter size of between any one of the following: approximately 5 and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. A volume-based particle size is the size of a sphere that has the same volume as the build material particle. With "average" it is intended to explain that most of the volume-based particle sizes are of the mentioned size or size range but that certain particles may have diameters outside of the mentioned range. The particle sizes may be chosen to facilitate distributing build material layers having thicknesses of between approximately 10 and approximately 500 microns, or between approximately 10 and approximately 200 microns, or between approximately 15 and approximately 150 microns.

An example build material may include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes. Build material as used herein also covers build materials comprising fibers. These fibers may for example be formed by cutting extruded fibers into short lengths. For example, a fiber length may be selected to allow effective spreading of the build material onto a platen or build platform. For example, the length may be approximately equal to the diameter of the fibers. In some examples, a powder may be formed from, or may include, short fibres that may, for example, have been cut into short lengths from long strands or threads of material.

In one specific example, the build material may comprise polyimide particles such as Polyamide 11 (PA-11) or Polyamide 12 (PA-12) or polypropylene particles (PP). Reducing an amount of functional agent with distance may avoid displacement of finer particles of Polyamide 11 or polypropylene, e.g. as compared to Polyamide 12. This may be useful when functional agent is to be deposited on one or more layers of unsolidified build material, such as when starting fabrication.

In certain examples, the determination performed by the print controller 130 is configured based on a build material type. A series of scaling factors may be defined for each build material type, such as in a look-up table or the like. For example, a greater reduction in functional agent quantity may be applied for Polyamide 11 as compared to Polyamide 12. For certain build materials, there may be no scaling or variation of functional agent usage. In other cases, a degree of scaling or variation of functional agent usage may be based on a determination of the type of build material being used, e.g. greater scaling may be applied to finer powders.

Figure 2:
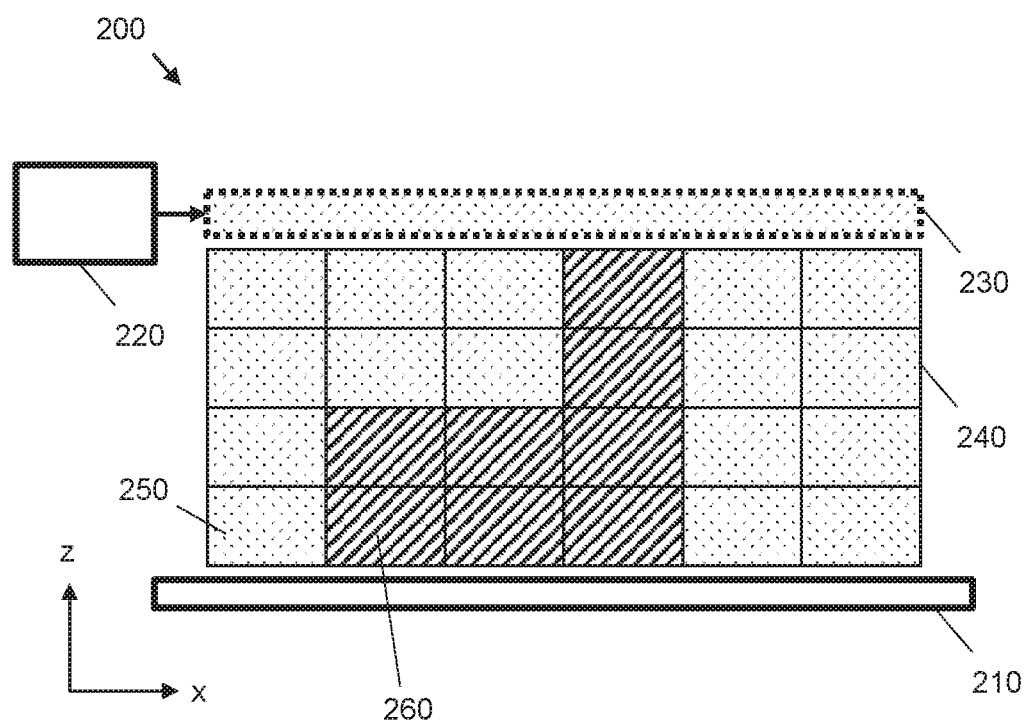
FIG. 2 is a schematic diagram showing an object being built by an example three-dimensional printing system.

FIG. 2 shows an example 200 of an object being fabricated from multiple layers of build material 240. FIG. 2 shows components that may be used to form a bed of build material 120 as shown in FIG. 1. FIG. 2 shows a platen 210 and a build material supply system 220. Layers of build material 240 may be successively deposited upon the platen. The platen 210 may form part of the three-dimensional printing system 100. The platen 210 may move relative to the build material supply system 220 during fabrication, e.g. a platen may move downwards in the z-direction. In certain examples, the platen 210 may form part of a build unit that is removable from the three-dimensional printing system 100, e.g. to allow extraction of fabricated objects. One three-dimensional printing system 100 may have multiple replaceable build units. In other examples, the platen 210 may form an integral part of the three-dimensional printing system 200.

The build material supply system 220 is configured to successively form layers of build material over the platen 210. At startup, there may be no layers of build material upon the platen 210, as such build material supply system 220 may deposit a layer 230 upon the upper surface of the platen 210. Subsequent layers may then be deposited on top of previous layers. Although not shown in FIG. 2, in certain examples one or more layers of build material may be deposited before fabrication begins, e.g. to form an initial bed of build material to build upon.

FIG. 2 shows how an object has been fabricated within four layers of build material 240. In this simple example, there are six addressable portions of each layer in the x-axis. There may be a similar number of addressable portions in the y-direction, e.g. such that each layer has 36 addressable areas in each layer. Each of these addressable areas may correspond to a voxel in a digital model of the object or there may be a mapping between voxels and addressable portions. Portions of a given layer of build material that correspond to voxels that contain solid portions of the object are solidified as solid portions 260. Portions of a given layer of build material that correspond to voxels that do not form part of the object are not solidified; these remain as unsolidified build material 250. When fabrication ends, an object may be retrieved by removing unsolidified build material 250.

Figure 3:
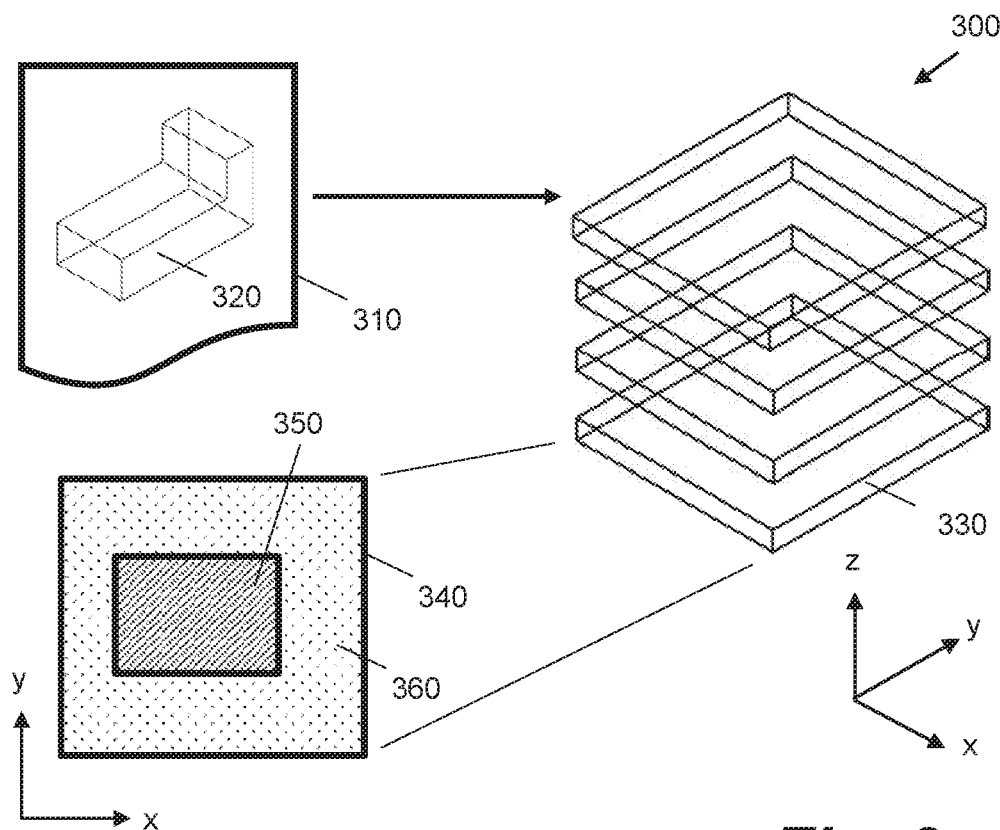
FIG. 3 is a schematic diagram showing how a model of an object may be converted into print control data according to an example.

FIG. 3 shows an example 300 of how print control data may be generated to instruct deposit of a functional agent on a bed of build material. Fabrication may begin following receipt of a model 310 of the three-dimensional object 320. The three-dimensional object 320 shown in FIG. 3 may correspond to the object shown in FIG. 2, and described later with reference to FIGS. 4A to 4C. The model 310 may be supplied as Computer-Aided Design (CAD) data, e.g. as a CAD file.

To generate print control data, a model 310 of an object may be deconstructed into a series of z-axis slices 330. In one case, a three-dimensional printing system may perform this deconstruction. In another case, the three-dimensional printing system may receive data in the form of z-axis slices 330 directly, e.g. as a series of raster images. Each z-axis slice 330 may be processed to generate print control data associated with the slice 340 that instructs the selective deposit of at least one functional agent. For example, in FIG. 3, the print control data slice 340 is formed as a solidification map where area 350 indicates solidification and area 360 indicates that no solidification is to occur. Area 350 thus corresponds to the base of the object 320. Areas of solidification may then be mapped to deposit of functional agent. For example, in one case, fusing agent and detailing agent may be applied in different densities and/or patterns based, for example, on thermal feedback or thermal modelling during fabrication. As described previously, the detailing agent may be used together with the fusing agent to control a thermal profile for the layer to allow solidification in area 350. In certain cases, not all of area 350 may map to deposit of fusing agent, e.g. it may be deemed that certain portions will solidify via thermal bleed or conduction, e.g. from lateral or adjacent portions of build material. In one case, a print control data slice 340 may be constructed by mapping voxels that are within a boundary of the object 320 to areas within a layer that receive fusing agent. Voxels outside the boundary of the object 320 may be mapped to instructions to either deposit no functional agent or instructions to deposit detailing agent, e.g. areas neighboring an edge of the object (e.g. in an immediate vicinity of the object) may be mapped to instructions to deposit a detailing agent. Outside of these neighboring areas neither fusing agent nor detailing agent may be deposited. In one case, voxels of an object model may be mapped to vectors representing properties of the object that are then further converted into discrete deposit instructions for one or more print heads.

In one case, print control data may be generated by considering a heat map corresponding to the object. For example, in a case where a fusing agent is applied, fusing agent usage may be computed based on a desired temperature for a given portion of build material. For example, in a simple case, a portion of build material may need to reach a temperature of $T_F$ degrees Celsius to melt and fuse and an energy source may warm the bed to a background temperature $T_A$. In this case, deposit of fusing agent may cause a portion of build material to absorb electro-magnetic radiation such that a temperature of the portion rises from $T_A$ to $T_F$. In a more complex example, a temperature profile for a layer may depend on factors such as a measured heating profile for an energy source, predicted cooling of the layer and/or a measured set of temperatures for a previous layer. In this case, a first set of print control data may be calculated based on portions of the object 320 to be solidified as indicate in the model 310, and this may be modulated to form a second set of print control data based on a temperature profile. This modulation may involve setting an amount of fusing agent to deposit for a given portion of build material to a particular range of values, e.g. a range having a minimum and maximum value of fusing agent. A minimum value may correspond to low heat levels for small parts or initial heat levels for initial layers of build material. This modulation may also involve setting an amount of detailing agent to cool build material where its temperatures are predicted or measured above the optimal fusing temperature $T_F$. In other cases, the mapping between the model 310 and print control data 340 may implicitly take into account temperature effects on each layer, e.g. an amount of functional agent may be set based on a parameterized function that takes the model data as input.

In the cases described above, an output for object fabrication is provided in the form of print control data that is used to instruct an amount of a functional agent to deposit in addressable areas of a layer of build material. The areas are "addressable" in the sense that it is possible to align a print head to deposit one or more drops of a functional agent within the area. An amount of a functional agent may correspond to a number of drops of liquid, wherein each drop has a pre-defined volume of liquid. Multiple drops of a functional agent may be deposited in one area, e.g. via ejection mechanisms having multiple drop sizes and/or multiple passes of a moveable carriage comprising the print head. According to certain examples described herein, the print control data is further processed to modulate an amount of the functional agent to be deposited on a given portion of build material in a given layer as a function of a distance between the given portion and a surface of the three-dimensional object. This is described below with reference to FIGS. 4A to 4C.

Figure 4A:
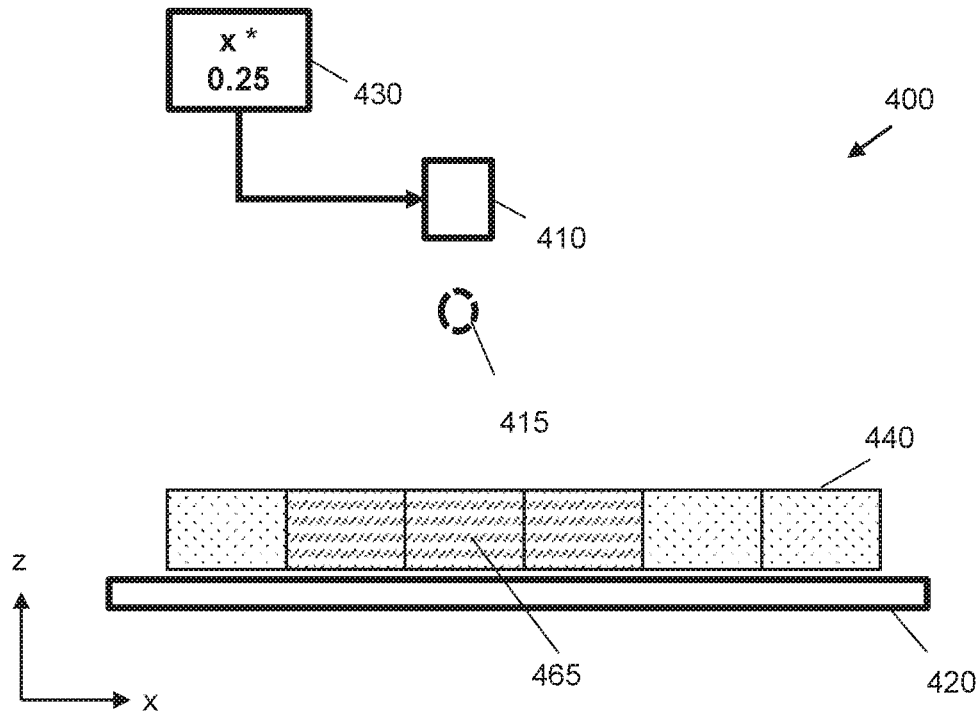
FIGS. 4A to 4C are schematic diagrams showing how an object may be fabricated layer by layer according to an example.
Figure 4B:
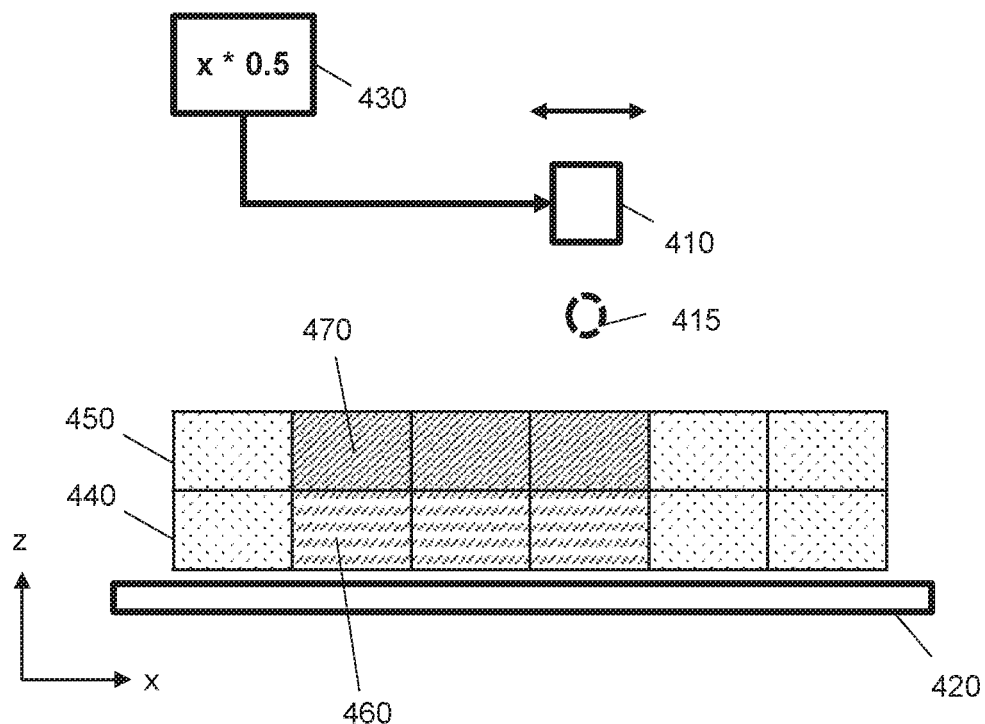
Figure 4C:
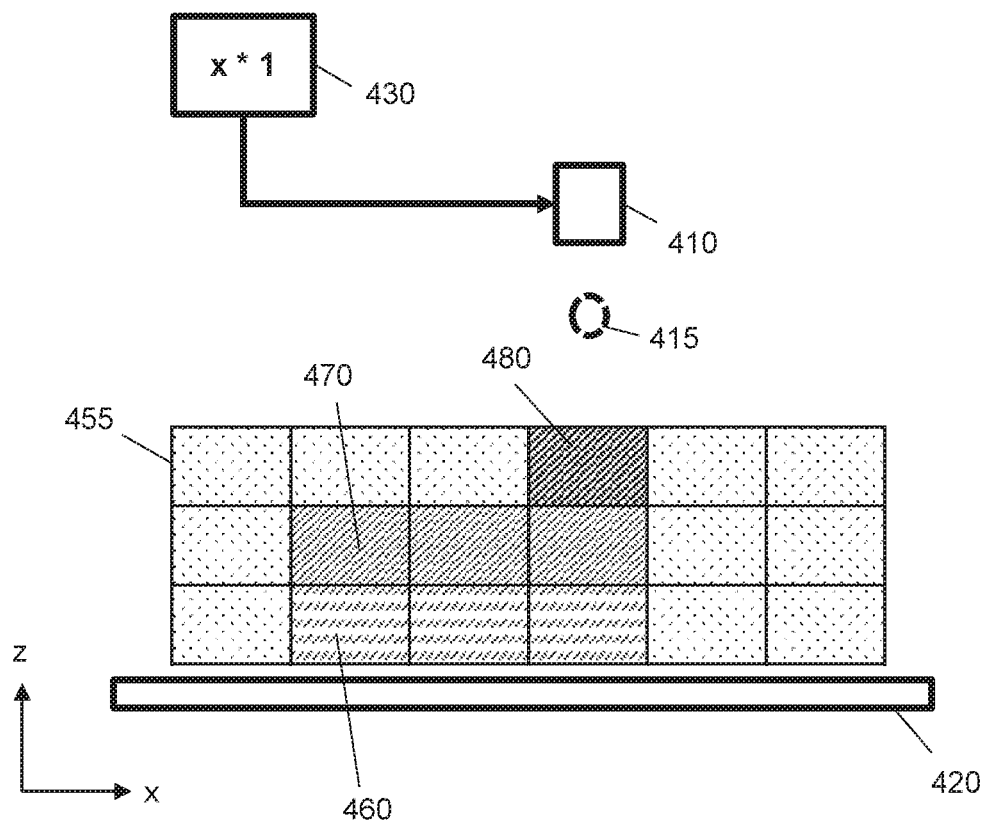

In FIGS. 4A to 4C, an example 400 is described where successive layers of build material 440 are built upon platen 420, e.g. in a similar manner to FIG. 3. In FIGS. 4A to 4C, a print head 410 deposits quantities of a functional agent 415 under the control of a print controller 430. The print head 410 and print controller 430 may be similar to those described with reference to FIG. 1. In this example, the print controller 430 scales the functional agent usage based on a distance between a given layer portion and a surface of an object to be fabricated. In the present example, the surface is a bottom surface. For ease of explanation, in these examples it is assumed that there is a one-to-one mapping between voxels in a digital domain and layers in a print domain. In other examples this may not be the case, and a distance may be computed based on one or more of a voxel distance and a layer distance as described above.

In FIG. 4A, a first layer of build material 440 has been formed on the platen 420. In this case, an object similar to the object 320 of FIG. 3 and shown in FIG. 2 is being fabricated. In FIG. 4A, the print controller 430 determines that the three portions of build material corresponding to a base of the object are located 0 voxels or layers from a lower surface of the object (i.e. these portions comprise the lower surface of the object). The print controller 430 is configured to obtain a scaling factor for a value of functional agent usage (e.g. an amount of functional agent to deposit as set within print control data) and apply this scaling factor to deposit instructions for the current portion (in this case portion 465). The scaling factor in the example is 0.25, i.e. the amount of functional agent is reduced to 25% of its initial value by the print controller 430. By using levels of functional agent that are below 100% of usage for the layers of an object that are formed upon unsolidified build material, a number of drops of functional agent may be reduced. This in turn reduces or avoids "splashing" of build material and allows the portion of build material to gradually increase in temperature, which ensure good stability and quality. In FIG. 4A, functional agent is deposited in three addressable areas of the layer. This may be achieved through relative movement of the print head 410 with respect to the platen 420. If the functional agent comprises a fusing agent, then energy may be applied after deposit to solidify the build material in the volumes corresponding to the three addressable areas.

FIG. 4B shows a subsequent layer 450 of build material that has been formed over the previous layer of build material 440, including solidified portions 460. For the subsequent layer 450, the print controller 430 determines that three portions of build material corresponding to a next layer of the object are located 1 voxel from a lower surface of the object, i.e. they are one layer above the base portions 460. The print controller 430 thus obtains a different scaling factor to apply to the functional agent usage. In this case, the scaling factor is 0.5, i.e. at 50% of a previously determined amount. Hence, relative to the previous layer, double the amount of functional agent is deposited in the three addressable areas corresponding to the object in the layer 450; however this is still half of a normal usage amount. As before, if the functional agent is a fusing agent, energy may be applied to fuse the portions 470 to solidify the next layer of the object. Thus at the end of the process shown in FIG. 4B, the object comprises two solidified layers, wherein the portions of the individuals layers fuse both within the layer (e.g. to neighboring portions in the x-y plane) and between the layers (e.g. to neighboring portions in the z-direction).

FIG. 4C shows a further subsequent layer of build material 455. For the further subsequent layer 455, the print controller 430 determines that a portion of build material corresponding to a next layer of the object is located 2 voxels from a lower surface of the object, i.e. it is two layers above the base portions 460. The print controller 430 thus obtains a different scaling factor to apply to the functional agent usage. In this case, the scaling factor is 1, i.e. the print controller 430 is not to modify a received amount of functional agent to deposit. From this layer upwards (e.g. until the object is finished as in FIG. 2), the print controller 430 is arranged not to modulate the functional agent usage.

The example 400 of FIGS. 4A to 4C shows how a variable scaling factor may be applied to functional agent usage to determine an amount of functional agent to be deposited during fabrication. This slow "startup" of the fabrication process helps prevents build material displacement and enhances part stability. Also by reducing an amount of functional agent that is applied to early layers of an object a cooling effect felt when liquid is deposited on a warmed bed of build material is reduced or avoided. This in turn may prevent warping and curling.

The example 400 "feathers" the application of functional agent over three layers of build material. In other examples, this variable scaling may be applied over any number of layers, and may depend on properties such as layer thickness. For example, for clarity of explanation, the example 400 is shown with a regular planar lower surface; however, objects may have irregular surfaces and a column of portions of build material in the z-axis may comprise multiple surfaces (e.g. an 'E' shape may have three lower surfaces in a given z-axis column of voxels). In one case, the scaling is applied to functional agent usage values that are output following modulation according to a heat map, i.e. a scaling factor is applied that represents a proportion of the functional agent amounts specified by the heat map. By applying the scaling factor to the output of the heat map modulation, it may be ensured the larger parts of an object receive more fusing agent that smaller parts independent of the application of the scaling.

In cases where the resolution of a voxel in the digital domain is different from an addressable area in the print domain, a voxel representing a portion of the object in a digital model may then be mapped to multiple addressable areas. Functional agent usage may then be set by determining a number of drops to be deposited for each addressable area that maps to the voxel, i.e. a density of functional agent use may be varied. This enables an amount of functional agent to be varied in printing systems with a fixed drop size.

Figures 5, 6:
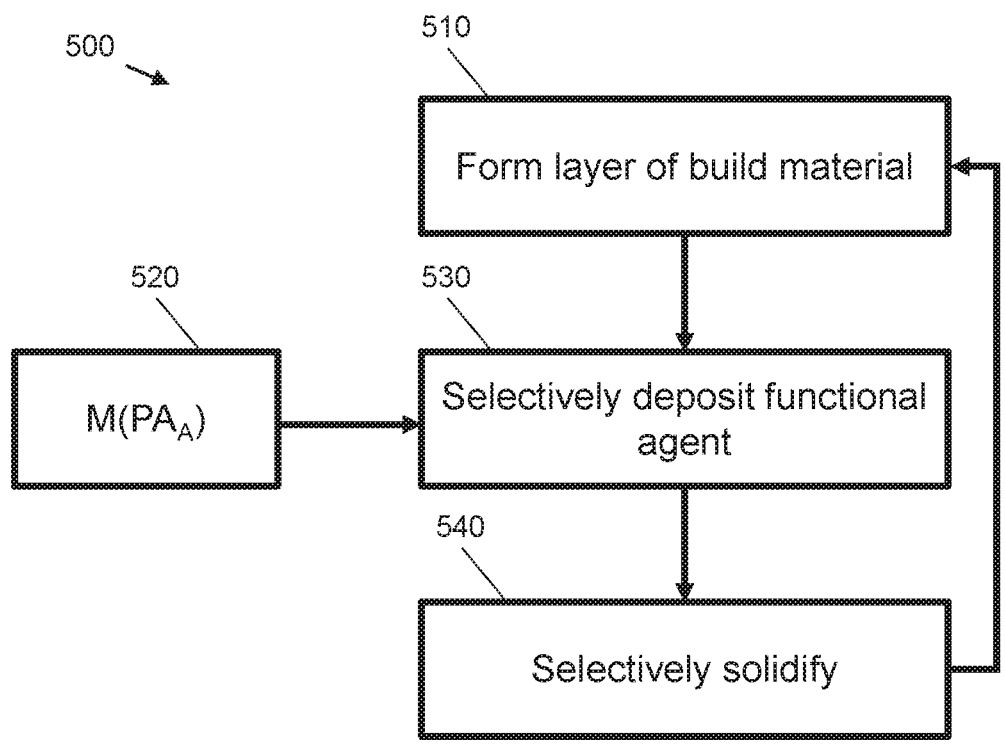
FIG. 5 is a flow chart showing a method of fabricating a three-dimensional object according to an example.
FIG. 6 is a table showing an example set of scaling factors for different z-axis distances.

FIG. 5 shows an example method 500 of fabricating a three-dimensional object. The method begins at block 510 where a layer of build material is formed. This may be formed using a build material supply system 220 as shown in FIG. 2. It may be formed by distributing a thin layer of powdered build material over a platen or a previous layer of build material. At block 520, an amount of functional agent to be deposited within addressable areas of the formed layer is determined. This is determined based on data derived from a model of the three-dimensional object, e.g. indicating where the functional agent is to be applied to solidify appropriate portions of the layer. In certain cases, an initial set of functional agent values are modulated based on the distance of portion within the layer to a surface of the three-dimensional object. At block 530, the functional agent is selectively deposited across the layer based on the amounts determined at block 520. At block 540, portions of the build material within the layer are selectively solidified in accordance with the selective deposit of the functional agent. For example, portions that receive a fusing agent may heat up and fuse following an application of energy, portions that receive a binding agent may be bound together, and portions that receive a detailing agent may not solidify even when energy is applied.

As shown in FIG. 5, the method is repeated for multiple layers until an object is fabricated. The modification of functional agent usage may vary for each layer, e.g. based on a distance to a surface of the object. As such the method may comprise modulating an amount of the functional agent to be deposited for a plurality of layers above the surface of the three-dimensional object. Block 520 may thus correspond to applying a scaling factor to an initial deposit amount, where the scaling factor varies for each layer.

In certain examples, the method may comprise obtaining data derived from the model of the three-dimensional object. For example, this may comprise model 310 or slices 330 as shown in FIG. 3. The data may then be processed to determine print control data for a plurality of z-axis slices. This print control data comprises instructions for the selective deposit of the functional agent. For example, this may comprise generating print control data slices 340 as shown in FIG. 3. In this example, determining an amount of the functional agent to be deposited at block 520 may comprise scaling deposit values within the print control data as a function of a distance between a given portion of build material and a surface of the three-dimensional object. In one case, the print control data may comprise functional agent usage values that have already been modulated based on a determined, desired or predicted temperature map corresponding to a given layer.

In cases where the functional agent comprises a fusing agent, block 530 may comprises depositing fusing agent upon portions of a given layer of build material that correspond to solid portions of the three dimensional object and block 540 may comprise applying energy to selectively fuse the portions of the given layer of build material that receive fusing agent. Fusing energy may be applied more or less uniformly across the whole of the layer, wherein selectivity is provided by the deposit of fusing agent. In this case, block 520 may involve reducing the amount of fusing agent to be deposited, e.g. as compared to an initial amount of fusing agent determined based on the data derived from the object model. In one case, the reduction may be applied to deposit values computed following thermal correction, e.g. based on a heat map of the layer.

In cases where the functional agent comprises a detailing agent, block 530 may comprise depositing detailing agent upon portions of a given layer of build material. These may be portions that do not correspond to solid portions of the three dimensional object, or portions that do correspond to solid portions but that require temperature control. Block 540 may comprise applying energy to the given layer of build material, wherein the detailing agent controls a temperature of the given layer. In this case, block 520 may comprise reducing the amount of detailing agent to be deposited e.g. as compared to an initial amount of detailing agent determined based on the data derived from the object model. In one case, the reduction may be applied to deposit values computed following thermal correction, e.g. based on a heat map of the layer. In one case, the detailing agent may be deposited in areas outside a part geometry to inhibit fusing (e.g. to immediate or neighboring areas to provide sharp edges). In another case, the detailing agent may be deposited within areas associated with part geometry to modulate fusing, i.e. based on temperature control. Both cases may occur for any given object.

In certain examples, the layers are formed in a build direction, e.g. a direction aligned with a z-axis. In this case, the distance may be determined in the build direction, e.g. may be a distance from a portion of build material to a lower surface in the z-direction.

FIG. 6 shows an example look-up table 600 that may be used to determine a scaling factor to apply to a particular addressable area of a layer of build material, e.g. as described in the above examples. To use the lookup table a voxel corresponding to a given portion or an addressable area may be determined. A distance in voxels from that voxel to a voxel in a lower surface may then be determined, e.g. by counting a number of voxels until a volume is reached that is outside of the object or at an edge of the object. Alternatively, a distance may be determined by counting a number of layers between a current layer and a layer containing a surface of the object to be fabricated. This distance is then used to lookup a value in the first row of the table. The scaling factor (as a percentage) is then retrieved from the next row in the same column. Applying to the examples of FIGS. 4A to 4C, the portions 460 in FIG. 4A are 0 voxels from a base of the object so the scaling factor retrieved from the table in this case is 15% and the portions 470 in FIG. 4A are then 1 voxel away from the base of the object so a scaling factor of 25% is retrieved.

In certain examples, an amount of the functional agent to be deposited on a given portion of build material may be determined as a function of a distance within a layer plane between the given portion and a surface of the three-dimensional object. For example, an amount of functional agent may be scaled based on a distance to a lateral edge in the x-y plane. This may correspond to applying a sharpening function to reduce or avoid "fuzzy" part edges. In this case, the scaling factor may vary as a function of the distance to a surface in the x-y plane from a given voxel or addressable area corresponding to a part of the object.

Figures 7, 8:
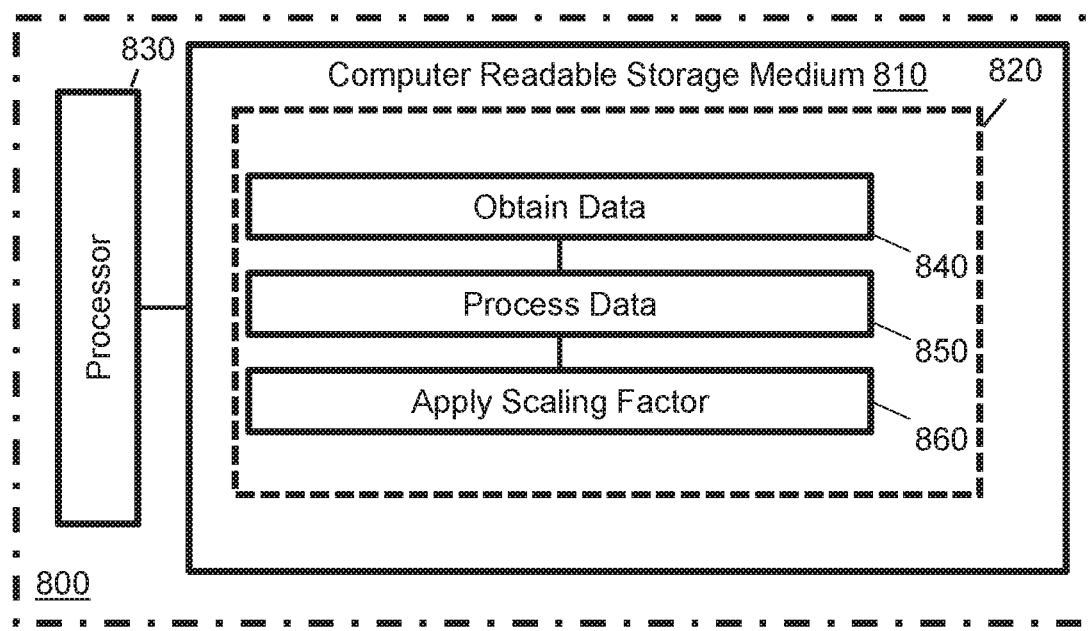
FIG. 7 is a table showing an example set of scaling factors for different x-y plane distances.
FIG. 8 is a schematic diagram showing a non-transitory machine readable medium according to an example.

FIG. 7 shows an example look up table 700 that may be used to determine a scaling factor to apply to a particular addressable area of a layer of build material. It may be applied instead of, or as well as, the scaling applied in relation to the table 600 of FIG. 6. The top row of the table 700 shows a distance range in voxels. The bottom row of the table 700 shows a scaling factor to be applied to an amount of functional agent to be deposited. This table thus increases deposit of a functional agent near a lateral edge or surface in an x-y plane. For example, the scaling factor may be applied to an amount of a fusing agent. As a given portion of build material is farther away from an edge an amount of functional agent returns to a normal amount (e.g. from a distance of 15 voxels or more in this example). The scaling factor shown in FIG. 7 may in certain cases be applied following the application of the scaling factor shown in FIG. 6, e.g. in general scaling to a surface in the x-y plane may be applied following scaling to a surface in the z-direction. This may effect a final sharpening filter that prevents edges in earlier layers from being fuzzy due to any reduction in functional agent usage applied by the scaling factor reduction of table 600.

FIG. 8 shows a computer device 800 comprising a non-transitory computer-readable storage medium 810 storing instructions 820 which, when loaded into memory and executed by at least one processor 830, cause the processor to process functional agent user values in a similar manner to the previously described examples. The computer-readable storage medium 810 may comprise any machine-readable storage media, e.g. such as a memory and/or a storage device. Machine-readable storage media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In one case, the processor 830 may be arranged to store instructions 820 in memory such as RAM to implement the complex event processing engine.

The instructions 820 are configured to cause the processor to first, via instruction 840, obtain data representative of a three-dimensional object to be fabricated. For example, this may comprise data representing a model of the object as per model 320 or slice data as per slices 330. Via instruction 850, the processor is caused to process the data to generate print control data for a plurality of layers extending within a z-axis. In this case each layer is defined as a plurality of addressable areas that extend within an x-axis and a y-axis, e.g. similar to slices 330 as shown in FIG. 3. The print control data instructs deposit of a functional agent for a given layer, such as a binding or fusing agent as described above. The print control data indicates which addressable areas are to become portions of the three-dimensional object to be fabricated, e.g. how voxels representing the object in a digital domain are to be mapped to physical portions of build material, wherein build material in a given layer is selectively solidified in accordance with the deposit of the functional agent, e.g. it may be fused following application of an energy source. Instruction 760 is configured to then cause the processor to apply a scaling factor to functional agent deposit values associated with addressable areas within the print control data, wherein the scaling factor is based on a distance in the z-axis between a given addressable area and a surface of the three-dimensional object. This distance may in turn be determined based on a voxel distance, e.g. by mapping back layers to voxels in the digital domain. In other examples, the scaling factor may additionally or alternatively be based on a distance in the x-y plane.

Certain examples described herein apply a scaling factor to functional agent usage values. The scaling factor may depend on a distance of a given portion of build material to a surface of an object, e.g. in the z-axis or x-y plane. The surface may be a lower or lateral surface. In one case, the scaling factor may reduce fusing agent usage for initial layers of an object. The scaling may further prevent functional agent usage values from rising too quickly for initial layers of an object. The scaling factor may be applied directly, e.g. by varying pre-determined values, or indirectly, e.g. setting absolute or pre-determined values to incorporate the feathering effects described herein. Functional agent usage may further be determined with or without a precursor heat map modulation stage.

Certain examples described herein may increase a quality of a lower or bottom surface of an object by slowly increasing functional agent usage. This may prevent displacement of build material in early layers and help ensure planar surfaces remain smooth (e.g. such that a base may rest on a surface such as a desk or table). Certain examples also increase a stability of early object formation; increased quantities of a functional agent such as a fusing agent are not applied until a part has warmed up enough to accommodate a cooling effect of agent application. This may also increase the quality of planar surfaces and avoid roughness.

Certain examples described herein also increase a reliability of the fabrication process as errors due to part instability and build material displacement may be reduced. The examples may also reduce a quantity of airborne powder and thus reduce or avoid clogging and increase print head reliability. Certain examples described herein further allow fabrication with colder background temperatures (e.g. $T_A$). This may lead to improved reliability as background temperatures may be more loosely controlled (e.g. may fall into a wider range), as a transition temperature where the build material just begins to "skin over" is not maintained to prevent "splashing". This also aids build material recyclability as unsolidified build material stays below a stage where it begins to "skin over". It also makes unsolidified build material easier to remove. There is also a reduced tendency for an object to thermally bleed into unsolidified build material.

The preceding description has been presented to illustrate and describe examples of the principles described. This description is not intended to be exhaustive or to limit these principles to any precise form disclosed. Many modifications and variations are possible in light of the above teaching. It should be noted that a three-dimensional object as described includes parts and portions of objects, i.e. covers any entity that may be fabricated by a three-dimensional printing system. It should also be noted that even though the examples feature production of a single object, multiple objects may also be reduced in one batch, e.g. within the layers of FIG. 2 or 4A-C. It is to be understood that any feature described in relation to any one example may be used alone, or in combination with other features described, and may also be used in combination with any features of any other of the examples, or any combination of any other of the examples.

What is claimed is:

1. A method of fabricating a three-dimensional object comprising:
receiving object data for the three-dimensional object, the object data comprising a plurality of voxels over a plane defined by x and y directions for each of a plurality of layers of build material along a z direction;

for each layer, determining a nominal amount of functional agent to be deposited on the layer in correspondence with the voxels of the layer;

for each layer, determining a functional agent scaling factor according to a distance between the layer and a bottom surface of the three-dimensional object along the z direction;

for each layer, determining an actual amount of the functional agent to be deposited on the layer in correspondence with the voxels of the layer, by scaling the nominal amount of the functional agent determined for the layer by the functional agent scaling factor determined for the layer;

for each layer, depositing the layer of build material, and then selectively depositing on the layer, in correspondence with the voxels of the layer, the actual amount of the functional agent that has been determined for the layer; and solidifying the layers to form the three-dimensional object, wherein the functional scaling agent factor for a top layer at a top surface of the three-dimensional object is greater than the functional scaling agent factor for a bottom layer at the bottom surface, and for each layer other than the bottom layer, the functional scaling agent factor increases or stays the same as compared to the functional scaling agent factor for an adjacent preceding layer, resulting in reduced splashing effects towards the bottom surface during deposition of the functional agent.

2. The method of claim 1, wherein, for each voxel of each layer, the nominal amount of the functional agent to be deposited on the layer in correspondence with the voxel is determined using a heat map.

3. The method of claim 1, wherein the functional agent scaling factor is a first functional agent scaling factor, and the method further comprises:

for each voxel of each layer, determining a second functional agent scaling factor according to a distance between the voxel and a surface of the three-dimensional object along the plane defined by the x and y directions, wherein, for each voxel of each layer, the actual amount of the functional agent to be deposited is determined by scaling the nominal amount of the functional agent by the second functional agent scaling factor in addition to the first functional agent scaling factor.

4. The method of claim 3, wherein, for each layer, the second functional agent scaling factor is greater for the voxels closest to the surface of the three-dimensional object along the plane defined by the x and y directions than for the voxels farthest from the surface along the plane, and for each voxel other than the voxels closest to the surface, the second functional agent scaling factor decreases or stays the same as compared to the second functional agent scaling factor for an adjacent voxel closer to the surface.

5. The method of claim 4, wherein, for each layer, the second functional agent scaling factor being greater for the voxels closest to the surface than for the voxels farthest from the surface, and for each voxel other than the voxels closest to the surface, the second functional agent scaling factor decreasing or staying the same as compared to the second functional agent scaling factor for the adjacent voxel closer to the surface, results in reduced fuzzy edge effects at the surface of the three-dimensional object.

6. The method of claim 1, wherein solidifying the layers comprises:

for each layer, after the layer of build material has been deposited and the functional agent has been selectively deposited on the layer, applying energy to the layer to solidify the layer where the functional agent has been deposited, such that solidification occurs on a layer-by-layer basis.

7. A three-dimensional printing system comprising:
a print head;
an energy source; and
a print controller configured to:
receive object data for the three-dimensional object, the object data comprising a plurality of voxels over a plane defined by x and y directions for each of a plurality of layers of build material along a z direction;

for each layer, determine a nominal amount of functional agent to be deposited on the layer in correspondence with the voxels of the layer;

for each layer, determine a functional agent scaling factor according to a distance between the layer and a bottom surface of the three-dimensional object along the z direction;

for each layer, determine an actual amount of the functional agent to be deposited on the layer in correspondence with the voxels of the layer, by scaling the nominal amount of the functional agent determined for the layer by the functional agent scaling factor determined for the layer;

for each layer, cause deposition of the layer of build material, and then cause the print head to selectively deposit on the layer and in correspondence with the voxels of the layer, the actual amount of the functional agent that has been determined for the layer; and cause the energy source to solidify the layers to form the three-dimensional object, wherein the functional scaling agent factor for a top layer at a top surface of the three-dimensional object is greater than the functional scaling agent factor for a bottom layer at the bottom surface, and for each layer other than the bottom layer, the functional scaling agent factor increases or stays the same as compared to the functional scaling agent factor for an adjacent preceding layer, resulting in reduced splashing effects towards the bottom surface during deposition of the functional agent.

8. The three-dimensional printing system of claim 7, wherein, for each voxel of each layer, the nominal amount of the functional agent to be deposited on the layer in correspondence with the voxel is determined using a heat map.

9. The three-dimensional printing system of claim 7, wherein the print controller is configured to cause the energy source to solidify the layers by:

for each layer, after the layer of build material has been deposited and the functional agent has been selectively deposited on the layer, causing the energy source to apply energy to the layer to solidify the layer where the functional agent has been deposited, such that the solidification occurs on a layer-by-layer basis.

10. A non-transitory machine readable medium comprising instructions which, when loaded into memory and executed by at least one processor, cause the processor to:

receive object data for a three-dimensional object, the object data comprising a plurality of voxels over a plane defined by x and y directions for each of a plurality of layers of build material along a z direction;

for each layer, determine a nominal amount of functional agent to be deposited on the layer in correspondence with the voxels of the layer;

for each layer, determine a functional agent scaling factor according to a distance between the layer and a bottom surface of the three-dimensional object along the z direction;

for each layer, determine an actual amount of the functional agent to be deposited on the layer in correspondence with the voxels of the layer, by scaling the nominal amount of the functional agent determined for the layer by the functional agent scaling factor determined for the layer;

for each layer, cause deposition of the layer of build material, and then cause selective deposition, on the layer and in correspondence with the voxels of the layer, of the actual amount of the functional agent that has been determined for the layer; and cause solidification of the layers to form the three-dimensional object, wherein the functional scaling agent factor for a top layer at a top surface of the three-dimensional object is greater than the functional scaling agent factor for a bottom layer at the bottom surface, and for each layer other than the bottom layer, the functional scaling agent factor increases or stays the same as compared to the functional scaling agent factor for an adjacent preceding layer, resulting in reduced splashing effects towards the bottom surface during deposition of the functional agent.

11. The non-transitory machine readable medium of claim 10, wherein the processor is to cause the solidification of the layers by:

for each layer, after the layer of build material has been deposited and the functional agent has been selectively deposited on the layer, causing energy to be applied to the layer to solidify the layer where the functional agent has been deposited, such that the solidification occurs on a layer-by-layer basis.

* * * * *